United States Patent Office 3,595,798
Patented July 27, 1971

3,595,798
CLEANSING COMPOSITIONS
Tom Smith, Leeds, and John Stewart Lodge, Dewsbury, England, assignors to Lever Brothers Company, New York, N.Y.
No Drawing. Filed Dec. 18, 1967, Ser. No. 691,238
Int. Cl. C11d 7/54
U.S. Cl. 252—95          3 Claims

ABSTRACT OF THE DISCLOSURE

This invention concerns a solid denture cleanser composition which contains a peroxygen compound and the dye erythrosine. The composition also contains an amino carboxylic acid chelating agent which acts to control the rate at which the colour due to the erythrosine of an aqueous solution of the composition fades.

---

This invention relates to cleansing compositions and in particular to compositions for the cleansing of dentures.

Compositions for the cleansing of dentures containing a peroxygen compound, for example sodium percarbonate or sodium perborate, are known. It has been proposed to include in such compositions a dye which produces a coloration when the composition is first dissolved in water but which is bleached by the oxygen released by the peroxygen compound and the intention is that the bleaching of the colour should indicate completion of the cleansing process.

It is generally considered that satisfactory cleansing of dentures can be effected by immersing them in about a 5% (w./v.) solution (i.e. 5 g. in 100 ml.) of the peroxygen compound-containing composition in warm water (45°–55° C.) for from about 10 to about 40 minutes and thus if a dye indicator is required one must be so chosen that the disappearance of the original colour of the solution occurs in about this period of time.

However, a difficulty occurs in formulating a composition of the peroxygen type containing a dye indicator system and arises from the fact that the rate of decomposition of the peroxygen compound is very much affected by the presence of small amounts, even as little as less than 0.1 p.p.m., of metal ions, for instance copper ions. Consequently, because the amount of copper in water varies from one place to another (and even possibly between different water supplies in one household), quite large variations can occur in the time required for the initial colour of a solution of such a composition to disappear. On the other hand, it was found, for almost all the dyes, that were tested, that a certain content of metal ions in the solution was necessary in order for a substantial fading of the colour to occur in the desired time. In other words, it was found that what usually happened with compositions containing a peroxygen compound and an appropriate amount of a dye to give a solution having an initial coloration of desirable strength was that in tap water the colour of the solution faded relatively quickly (the actual period differing from one water to another) and in demineralised water the colour faded very slowly, if at all.

It was therefore most surprising to find that the dye erythrosine (Colour Index No. 45403) behaved in exactly the opposite manner to all the other dyes which were tested. Thus it was found that erythrosine faded in demineralised water. This most unusual property has been made use of in formulating the composition of the invention for it has also been found that by inclusion of a suitable chelating agent in the composition the prolonged fade times of erythrosine in tap water can be reduced to times generally of the desired length irrespective of the water supply.

According to the invention therefore there is provided a solid denture cleansing composition containing a peroxygen compound and a dye, which composition on dissolving in water produces a coloured solution the colour of which in time fades, wherein the composition contains the dye erythrosine and, to control the time of fading of the color due to the erythrosine of an aqueous solution of the composition, the composition also contains an amino carboxylic acid chelating agent or a water-soluble salt thereof.

Examples of chelating agent which may be employed in the composition of the invention are ethylene diamine tetra-acetic acid, nitrilo triacetic acid, diethylene triamine penta-acetic acid, hydroxyethyl ethylene diamine triacetic acid, 1,2-diamino-cyclohexane tetra-acetic acid, amino diacetic acid, and hydroxyethyl amino diacetic acid. These acids can be used in the form of their water-soluble salts, particularly their alkali metal salts. Especially preferred as the chelating agent are the di and tetra-sodium salts of ethylene diamine tetra-acetic acid and the tri-sodium salt of nitrilo triacetic acid.

The amount of chelating agent employed will generally be above about 0.02% and usually will not exceed about 1% by weight of the composition. At the higher levels of chelating agent it may be found that the effervescent or foaming properties of an aqueous solution of the composition are adversely affected. If, therefore, good foaming properties are desired it is recommended that the amount of chelating agent should not exceed about 0.5% by weight of the composition. The preferred range is 0.1 to 0.5% by weight of the composition.

It is believed that the chelating agent acts to control the fade time of the dye by chelating any copper ions that may be present in the solution of the composition although it seems apparent that chelation of calcium and magnesium ions also plays a part in the control of the fade time.

Erythrosine will be included in the composition in an amount sufficient to give a solution of the composition an initial coloration of adequate strength. A preferred amount is from 0.01 to 0.05% by weight of the composition. Minor amounts (for example about 0.001% by weight of the composition) of other dyestuffs can also be included in the composition with erythrosine. Particularly suitable has been found Orange I (Colour Index No. 14600). This has been found useful as, when used in minor amount, a good initial pink colour of the treatment solution is obtained; increasing the level of erythrosine tends to produce an orange note to the colour which may not be so aesthetically acceptable. The colour of the treatment solution due to a minor amount of Orange I in the composition of the invention fades much sooner than the colour due to the erythrosine. It may be mentioned here that experiments made with Orange I showed that this dye behaves in the usual manner in that compositions containing a peroxygen compound and Orange I give longer fade times in demineralised water than in tap water.

As mentioned above, examples of suitable peroxygen compounds are sodium percarbonate and sodium perborate. Other examples are urea peroxide and potassium monopersulphate. Typical amounts of peroxygen compound included in the composition are from 5 to 60% by weight. The amount of peroxygen compound used will to some extent govern the rate of fading of the erythrosine.

As solutions of peroxygen compounds are generally recognised as being more effective denture cleansers if their pH is in the range of from about 9.5 to about 11.5, sufficient alkaline material is desirably incorporated in the composition so that a 5% solution has a pH between these values. Suitable alkaline materials are trisodium orthophosphate and sodium carbonate.

Other ingredients which are desirably included are sodium chloride (for example from 5 to 60% by weight) and sodium tripolyphosphate or sodium pyrophosphate (for example in amounts of from 5 to 40% by weight). Other ingredients which may be included in minor proportions are surface active agents, flavor and perfume.

Germicides, for instance hexachlorophene, may also be incorporated in compositions of the invention.

The composition may be in the form of a powder or tablet. If in the form of a tablet, it is desirable that there should be included in the composition a disintegrating agent to assist rapid dissolution of the composition in water.

It is found that if erythrosine is merely mixed with the other powdered ingredients, the particles of the other ingredients tend to become coloured pink. Consequently if it is required to produce a composition of the invention in the form of a powder which is generally white in colour, it has been found necessary to include the erythrosine in a special way, for example in the form of a coloured speckle. This can be done by colouring some of the particles of one of the other components and, in order to prevent transfer of the colour to the other particles, coating the coloured particles with a cold water-soluble starch.

The following example illustrates the invention.

EXAMPLE

The denture cleansing composition of this example is in the form of a white powder containing a red speckle.

The composition of the denture cleanser is the following, percentages being by weight.

| | Percent |
|---|---|
| Sodium percarbonate | 25.000 |
| Trisodium orthophosphate (anhydrous) | 25.000 |
| Sodium tripolyphosphate | 10.000 |
| Sodium carbonate (anhydrous) | 12.000 |
| Sodium lauryl sulphate | 0.030 |
| Hexachlorophene | 0.095 |
| Flavouring material | 0.400 |
| Orange I | 0.00125 |
| Disodium salt of ethylene diamine tetra-acetic acid | 0.250 |
| Red speckle | 1.500 |
| Sodium chloride | To 100.00000 |

The red speckled component has the following composition:

| | Percent |
|---|---|
| Sodium chloride | 97.00 |
| Cold water-soluble starch | 0.67 |
| Erythrosine | 2.00 |
| Hexachlorophene | 0.33 |

The speckled component is made by mixing part of the sodium chloride with the starch and, whilst still mixing, water is added followed by the erythrosine and hexachlorophene. The remainder of the sodium chloride is then added and the whole thoroughly mixed. The mixture is then dried and milled.

A 5% solution of the above product has a pH of 10.5 to 11.5.

The following experiment shows how the fade time can be controlled by varying the level of the chelating agent.

To the composition of the above example (from which the chelating agent has been omitted) differing amounts of the disodium salt of ethylene diamine tetra-acetic acid (EDTA) and of the tri-sodium salt of nitrilo triacetic acid (NTA) were added. 5 g. of the resulting product were added to 100 ml. of water at 50° C. and the fade times were determined. Two sources of water were employed; one was taken from a hot water supply and contained 0.14 p.p.m. Cu and the other was taken from a cold water supply and this contained 0.03 p.p.m. Cu. The water from the hot water supply was soft water and that from the cold water supply was hard water. The results are given in Table I below.

TABLE I

| Percent by weight of chelating agent in composition | | Fade time (minutes) | |
|---|---|---|---|
| | | Hot water supply | Cold water supply |
| 0 | | (¹) | (¹) |
| 0.025% | EDTA | 30 | |
| | NTA | 30 | |
| 0.05% | EDTA | 20 | 20 |
| | NTA | 15 | 20 |
| 0.10% | EDTA | 20 | 25 |
| | NTA | 15 | 20 |
| 0.25% | EDTA | 30 | 35 |
| | NTA | 20 | 30 |
| 1.00% | NTA | 25 | 25 |

¹ No fading.

As an instance of the behaviour of many of the other dyes which also give pink solutions that were tested, is mentioned the dye Ponceau 3 G (C.I. 15970 modified). The dyestuff used at the same level as erythrosine and in place of it in the composition described in the above example but omitting the chelating agent gave a fade time of 20–25 minutes in the water containing 0.14 p.p.m. Cu and no fade in the water containing 0.03 p.p.m. Cu. When the chelating agent was included (0.25%) there was no fading for both of the waters. These products were, as previously, tested at a 5% (w./v.) level in water at 50° C.

By using the composition of the invention at different concentrations in the treatment solution different fade times are obtained. This is shown by the results in Table II below where are given the results of experiments similar to those reported in Table I but where 5 g. of the composition tested were added to 200 ml. of water rather than to 100 ml.

TABLE II

| Percent by weight of chelating agent in composition | | Fade time (minutes) | |
|---|---|---|---|
| | | Hot water supply | Cold water supply |
| 0 | | (¹) | (¹) |
| 0.10% | EDTA | 30 | 40 |
| | NTA | 15 | 30 |
| 0.25% | EDTA | 40 | 35 |
| | NTA | 35 | 35 |
| 0.50% | EDTA | 40 | 40 |
| | NTA | 45 | 45 |
| 1.00% | EDTA | 60 | 60 |
| | NTA | 20 | 30 |

¹ No fading.

What is claimed is:

1. A solid alkaline denture composition consisting essentially of from 5 to 60% by weight of a peroxygen compound selected from the group consisting of sodium percarbonate, sodium perborate, urea peroxide and potassium monopersulfate and from 0.01 to 0.05% by weight of the dye erythrosine which composition on dissolving in water produces a coloured solution the colour which at 50° C. fades completely within about 10 to about 40 minutes of a 5% solution of said composition, said composition also contains from about 0.02 to 1% by weight of a chelating agent selected from the group consisting of ethylene diamine tetra-acetic acid, nitrilotriacetic acid, diethylene triamine penta-acetic acid, hydroxyethyl ethylene diamine triacetic acid, 1,2-diamino-cyclohexane tetra-acetic acid, amino diacetic acid, hydroxyethyl amino diacetic acid and the water-soluble salts thereof.

2. A denture cleansing composition according to claim 1, wherein the amount of the chelating agent is from 0.1 to 0.5% by weight of the composition.

3. A solid denture cleansing composition according to claim 1, containing
  (i) 5 to 60% of a peroxygen compound;
  (ii) 5 to 60% of sodium chloride;
  (iii) 0.02 to 1.0% of ethylene diamine tetra-acetic acid or nitrilo-triacetic acid or a water-soluble salt of these acids;
  (iv) 0.01 to 0.05% of erythrosine; and
  (v) alkaline material in an amount required to adjust the pH of a 5% solution of the composition to from about 9.5 to about 11.5.

References Cited

UNITED STATES PATENTS

| | | | |
|---|---|---|---|
| 3,211,658 | 10/1965 | Hirtz et al. | 252—99 |
| 3,243,377 | 3/1966 | Stolar et al. | 252—100 |
| 3,243,378 | 3/1966 | Stoltz et al. | 252—99 |
| 3,355,392 | 11/1967 | Cantor et al. | 252—99 |

MAYER WEINBLATT, Primary Examiner

U.S. Cl. X.R.

252—96, 97, 98, 99, 186